United States Patent
Thakur et al.

(10) Patent No.: US 12,007,929 B2
(45) Date of Patent: Jun. 11, 2024

(54) LOW-LATENCY OPTICAL CONNECTION FOR CXL FOR A SERVER CPU

(71) Applicant: Intel Corporation, Santa Clara, CA (US)

(72) Inventors: Anshuman Thakur, Beaverton, OR (US); Dheeraj Subbareddy, Portland, OR (US); MD Altaf Hossain, Portland, OR (US); Ankireddy Nalamalpu, Portland, OR (US); Mahesh Kumashikar, Bangalore (IN)

(73) Assignee: Altera Corporation, San Jose, CA (US)

( * ) Notice: Subject to any disclaimer, the term of this patent is extended or adjusted under 35 U.S.C. 154(b) by 656 days.

(21) Appl. No.: 17/067,365

(22) Filed: Oct. 9, 2020

(65) Prior Publication Data

US 2022/0114125 A1    Apr. 14, 2022

(51) Int. Cl.
    *G06F 13/40*     (2006.01)

(52) U.S. Cl.
    CPC ................ *G06F 13/4068* (2013.01)

(58) Field of Classification Search
    None
    See application file for complete search history.

(56) References Cited

U.S. PATENT DOCUMENTS

| | | | |
|---|---|---|---|
| 11,388,268 B1 * | 7/2022 | Siva | ............ H04L 1/0001 |
| 2008/0244150 A1 | 10/2008 | Sharma | |
| 2010/0318703 A1 | 10/2010 | Zhu | |
| 2013/0268713 A1 | 10/2013 | Choi | |
| 2014/0115420 A1 | 4/2014 | Willey et al. | |
| 2014/0344595 A1 | 11/2014 | Jenne et al. | |
| 2018/0095923 A1 | 4/2018 | Iyer | |
| 2020/0125503 A1 | 4/2020 | Graniello | |

FOREIGN PATENT DOCUMENTS

KR    10-2016-0131870    11/2016

OTHER PUBLICATIONS

Y. Wang, H. Gu, K. Wang, Y. Yang and K. Wang, "Low-power low-latency optical network architecture for memory access communication," in Journal of Optical Communications and Networking, vol. 8, No. 10, pp. 757-764, Oct. 2016, doi: 10.1364/JOCN 8.000757. (Year: 2016).*

(Continued)

*Primary Examiner* — Farley Abad
*Assistant Examiner* — Dayton Lewis-Taylor
(74) *Attorney, Agent, or Firm* — Schwabe, Williamson & Wyatt, P.C.

(57) ABSTRACT

A processor having a system on a chip (SOC) architecture comprises one or more central processing units (CPUs) comprising multiple cores. An optical Compute Express Link (CXL) communication path incorporating a logical optical CXL protocol stack path transmits and receives an optical bit stream directly after the link layer, bypassing multiple levels of the CXL protocol stack. A CXL interface controller is connected to the one or more CPUs to enable communication between the CPUs and one or more CXL devices over the optical CXL communication path.

22 Claims, 5 Drawing Sheets

(56) References Cited

OTHER PUBLICATIONS

D. D. Sharma, "Compute Express Link®: An open industry-standard interconnect enabling heterogeneous data-centric computing," 2022 IEEE Symposium on High-Performance Interconnects (HOTI), CA, USA, 2022, pp. 5-12, doi: 10.1109/HOTI55740.2022.00017 . (Year: 2022).*
International Preliminary Report on Patentability for International Patent Application No. PCT/US2021/047987, dated Apr. 20, 2023, 6 pgs.
Office Action from Netherlands Patent Application No. 2029099 dated Apr. 4, 2022, 14 pages.
Chamberlain Roger, et al., "virtualized Logic Computations View project Magnetologic View project Experimental Federated Modeling of an Optical Data Path," Jan. 31, 2004 bladzijden 1-12, XP055902066 Gevoden op het Internet: URL: https://www.researchgate.net/publicationn/228871025_Experimental_federated_m odeling_of_an_optical_data_path/download.
International Search Report and Written Opinion for Patent Application No. PCT/US2021/047987 dated Dec. 3, 2021, 12 pages.

\* cited by examiner

LOW-LATENCY OPTICAL CONNECTION FOR CXL FOR A SERVER CPU

TECHNICAL FIELD

Embodiments of the disclosure are in the field of integrated circuit structures, and in particular, a low-latency optical connection for CXL for a server CPU.

BACKGROUND

Compute Express Link (CXL) is an open industry standard interconnect offering high-bandwidth, low-latency connectivity between host processor and devices such as accelerators, memory buffers, and smart I/O devices. CXL is based on the PCI Express® (PCIe®) 5.0 physical layer infrastructure. It is designed to address the growing high-performance computational workloads by supporting heterogeneous processing and memory systems with applications in Artificial Intelligence, Machine Learning, communication systems, and High Performance Computing.

A server central processing unit (CPU) implemented as a system on a chip (SOC) may implement the full stack of CXL to enable a standards-based communication channel. CXL connections define an electrical physical layer based on the PCIe PHY layer that supports 32 gb/s/lane in bandwidth. This speed historically has been doubling with every generation of the specification. At 32 gb/s and 64 gb/s speeds, a non-return-to-zero (NRZ) signal is used that does not require error correction to maintain BER (bit-error rate). However, once the speed goes beyond 100 gb/s, the error rate increases, requiring PAM4 (Pulse-amplitude modulation) for transmission. This, in turn, implies a forward-error correction schedule (FEC) to reduce the errors, introducing almost 100 ns latency in the electrical communication transmit and the receive paths combined.

DESCRIPTION OF THE EMBODIMENTS

A low-latency optical connection for CXL for a server CPU is described. In the following description, numerous specific details are set forth, such as specific material and tooling regimes, in order to provide a thorough understanding of embodiments of the present disclosure. It will be apparent to one skilled in the art that embodiments of the present disclosure may be practiced without these specific details. In other instances, well-known features are not described in detail in order to not unnecessarily obscure embodiments of the present disclosure. Furthermore, it is to be understood that the various embodiments shown in the Figures are illustrative representations and are not necessarily drawn to scale. In some cases, various operations will be described as multiple discrete operations, in turn, in a manner that is most helpful in understanding the present disclosure, however, the order of description should not be construed to imply that these operations are necessarily order dependent. In particular, these operations need not be performed in the order of presentation.

Certain terminology may also be used in the following description for the purpose of reference only, and thus are not intended to be limiting. For example, terms such as "upper", "lower", "above", "below," "bottom," and "top" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

Embodiments of the disclosure are directed a processor architecture that supports an optical CXL communication path, or a dual Compute Express Link (CXL) communication path comprising both the electrical CXL communication path and an optical CXL communication path. The electrical communication path incorporates a logical CXL protocol stack having multiple levels including a protocol layer, a transaction layer, a link layer, a MAC layer, a PHY layer, and a physical channel to send and receive an electrical signal or bit stream. The optical CXL communication path incorporates a logical CXL protocol stack but transmits and receives an optical signal or bit stream directly after the link layer, thus bypassing multiple levels of the CXL protocol stack. In the dual communication embodiment path, the processor architecture further includes a multiplexer to direct data frames to either the electrical communication path or the optical communication path.

Accordingly, embedding an optical CXL connection within a CPU provides a path to a low-latency transmission at high speeds. The optical transmission error rates are much lower, hence inline Forward error correction (FEC) is not required saving ~100 ns of latency. The disclosed embodiments describe a CXL path that supports both optical, or electrical and optical, connections that run CXL protocol from a processor/SOC. Transitioning to optical technology will require that the SOC-implemented server CPU support both electrical as well as optical links for the few generations while the industry is transitioning to full optical. The low-latency optical CXL connection for a server CPU may be applicable high-performance high-bandwidth computing, and scalable architectures to provide high-bandwidth connectivity.

Figure 1A:
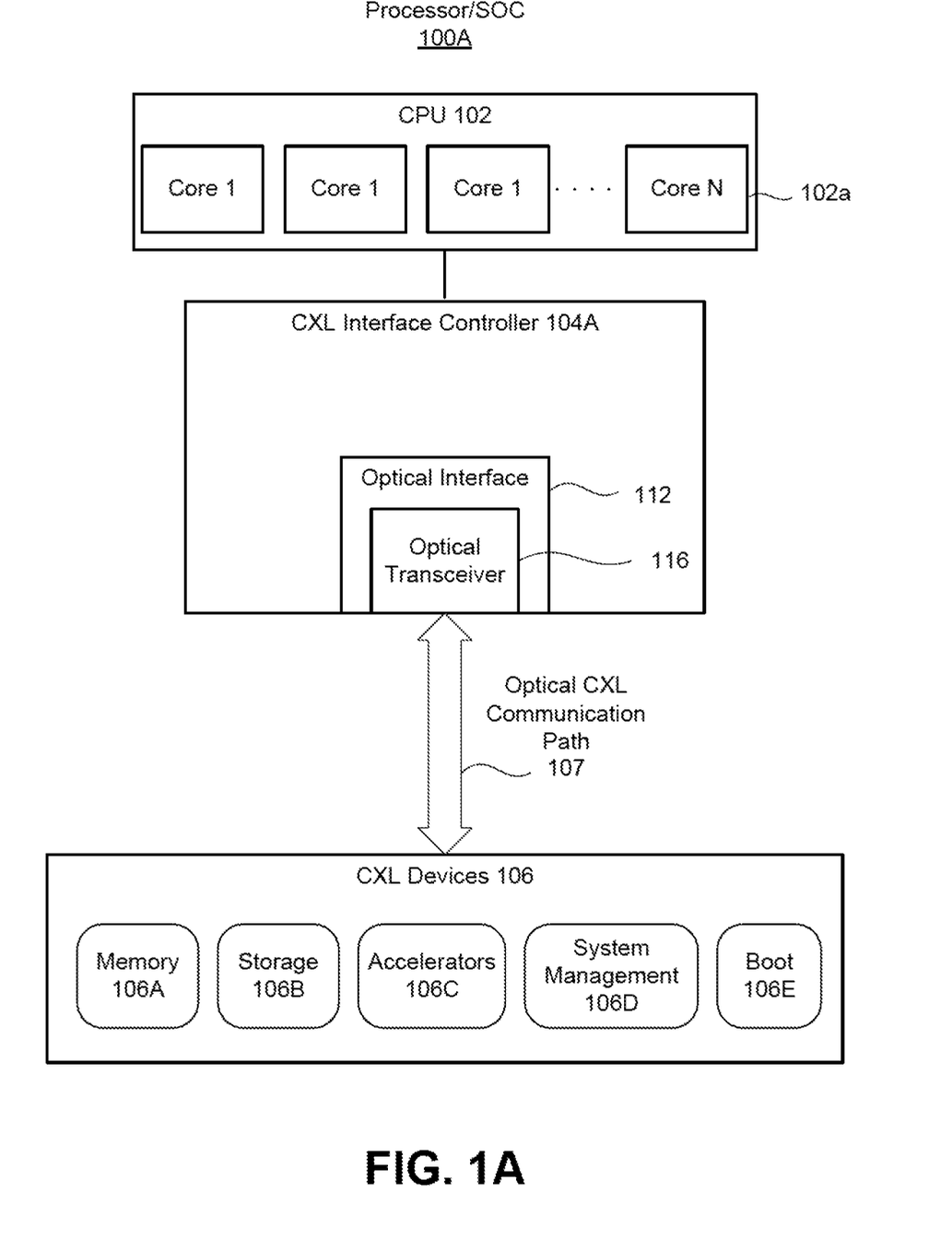
FIG. 1A illustrates a processor having a system on a chip (SOC) architecture with a low-latency optical Compute Express Link (CXL) communication path in accordance with one embodiment.

FIG. 1A illustrates a processor having a system on a chip (SOC) architecture with a low-latency optical CXL communication path in accordance with one embodiment. The processor/SOC 100 includes one or more central processing units (CPUs) 102 each comprising multiple cores 102a. Generally, the SOC architecture for a server CPU may include approximately 16 cores 102a, and supports high-speed, low-latency communication channels. The SOC architecture also may support collaborative computing between CPUs 102 of the same type to create clusters of multiple CPUs suitable for server applications.

According to embodiments, the processor/SOC 100A is provided with an optical CXL communication path 107 and a CXL interface controller 104A. The optical CXL communication path 107 incorporates a logical optical CXL protocol stack that transmits and receives an optical signal or bit stream directly after a link layer of the CXL protocol stack, thus bypassing multiple lower-levels of the CXL protocol stack and reducing latency.

The CXL interface controller 104A is connected to the CPU 102 to enable communication between the CPU 102 and one or more CXL devices 106 over the optical CXL communication path 107 to which the CXL devices 106 are connected. The CXL interface controller 104A comprises an optical interface 112. The optical interface 112 may comprise one or more optical transceivers 116 to control communication between the CPU 102 and the CXL devices 106 over the optical communication path 108B. The optical transceiver 116 transmits and receives optical signals over each of one or more optical channels. The optical transceiver 116 may include a plurality of optical waveguides each coupled into a photodetector, such as, but not limited to, a p-i-n photodiode, and/or coupled to laser emitters. The photodetector/lasers are in turn electrically coupled to downstream integrated circuitry, which may for example further include a voltage supply and sense/drive circuitry.

The CXL devices 106 may comprise any device capable of communication via the CXL protocol. The CXL devices 106 may provide any type of I/O functionality and may include any combination of a memory devices (e.g., DRAMs) 106A, storage devices 106B, accelerator devices (e.g., FPGAs and GPUs) 106C, system management controllers 106D, and system boot devices 106E. In one embodiment, one or more of the CXL devices 106 may comprise an on-chip component within the processor/SOC 100. In another embodiment, one or more of the CXL devices 106 may comprise an off-chip component. The CXL devices 106 may be located on a backside of a processor board of the processor/SOC 100 or on a separate I/O board located in a server rack, for example.

Figure 1B:
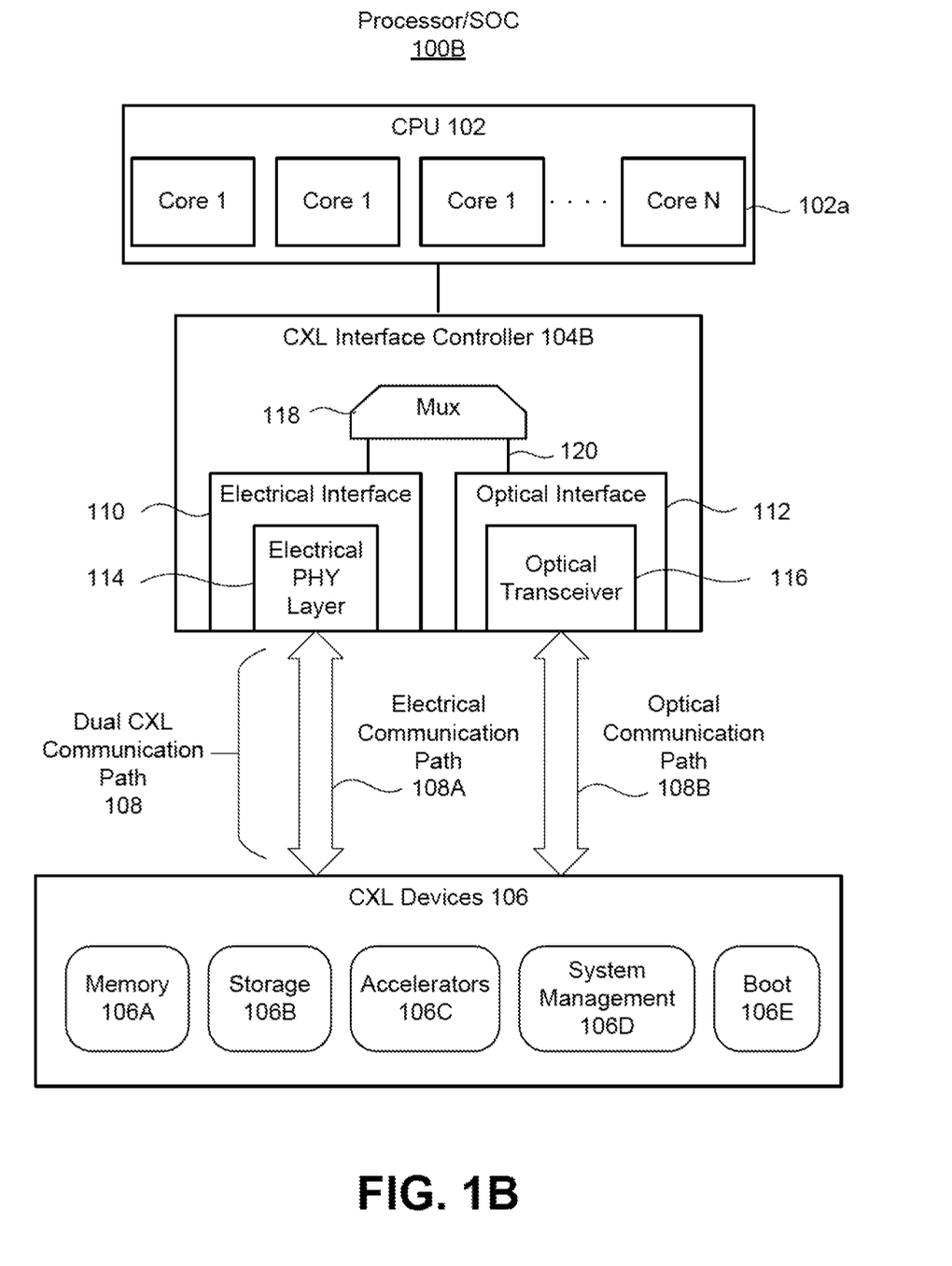
FIG. 1B illustrates a processor having a (SOC) architecture with a dual CXL communication path in accordance with another embodiment.

FIG. 1B illustrates a processor having a (SOC) architecture with a dual CXL communication path in accordance with another embodiment, where like components from FIG. 1A have like reference numerals. As in FIG. 1A, the processor/SOC 100B includes one or more central processing units (CPUs) 102 each comprising multiple cores 102a.

According to embodiments, the processor/SOC 100 further includes a dual CXL communication path 108 and a CXL interface controller 104B. The dual CXL communication path 108 comprises an electrical communication path 108A and an optical communication path 108B. The electrical communication path 108A incorporates a logical electrical CXL protocol stack having multiple levels including a protocol layer, a transaction layer, a link layer, a MAC layer, a PHY layer, and a physical channel to transmit and receive an electrical signal or bit stream, as described with respect to FIG. 2. The optical CXL communication path 108B incorporates a logical optical CXL protocol stack path that transmits and receives an optical signal or bit stream directly after the link layer, thus bypassing multiple levels of the CXL protocol stack.

The CXL interface controller 104B is connected to the CPU 102 to enable communication between the CPU 102 and one or more CXL devices 106 over the dual CXL communication path 108 to which the CXL devices 106 are connected. The CXL interface controller 104B includes a multiplexer (MUX) 118 to direct data frames, such as link layer (LPIF) frames, to either the electrical communication path 108A or the optical communication path 108B.

In one embodiment, the CXL interface controller 104 further includes an electrical interface 110 and an optical interface 112 connected to the multiplexer 118. The electronic interface 110 may comprise an electrical physical layer 114 and controls communication between the CPU 102 and the CXL devices 106 over the electrical communication path 108A. In one embodiment, the electronic interface 110 and electrical communication path 108A may comprise any types of network, such as an Ethernet network interface based on Ethernet protocols, but non-Ethernet protocols and link structures may be used with the electrical communication path 108A.

The optical interface 112 may comprise one or more optical transceivers 116 to control communication between the CPU 102 and the CXL devices 106 over the optical communication path 108B. The optical transceiver 116 transmits and receives optical signals over each of one or more optical channels. The optical transceiver 116 may include a plurality of optical waveguides each coupled into a photodetector, such as, but not limited to, a p-i-n photodiode, and/or coupled to laser emitters. The photodetector/lasers are in turn electrically coupled to downstream integrated circuitry, which may for example further include a voltage supply and sense/drive circuitry.

Thus, the multiplexer 118 multiplexes the dual CXL communication path 108 between the electrical communication path 108A and the optical communication path 108B through the electrical interface 110 and the optical interface 112, respectively. In embodiments, the multiplexer 118 multiplexes communication directly after the link layer of the CXL protocol stack. The multiplexer 118 selects or switches between the electrical interface 110 and the optical interface 112 using select lines 120.

According to one embodiment, the CXL interface controller 104 may control selection by the multiplexer 118 based on a physical distance between a particular CXL device 106 and the CPU. If the distance the data stream must travel between the CPU 102 and the CXL device 106 is large, then the CXL interface controller 104 causes the multiplexer 118 to enable the optical communication path 108B. If the distance the data stream must travel between the CPU 102 and the CXL device 106 is relatively short and/or requires low bandwidth, then the CXL interface controller 104 causes the multiplexer 118 to disable the optical communication path 108B and use the electrical communication path 108A. In one embodiment, the distances may be determined by table lookup or determined dynamically.

The processor/SOC 100 with an optical communication path 107 or a dual CXL communication path 108 provides several advantages. The addition of the optical communication path 108B provides a low-latency transmission path, providing the processor/SOC 100 with support for CXL protocol on both electrical and optical links. In addition, bandwidth adjustment may be made based on link bandwidth for added flexibility (i.e., the electrical communication path 108A has lower bandwidth requirements than the optical to communication path 108D). The addition of the optical communication path 108B also provides a migration path for server CPUs until full optical communication is adopted/implemented.

Figure 2:
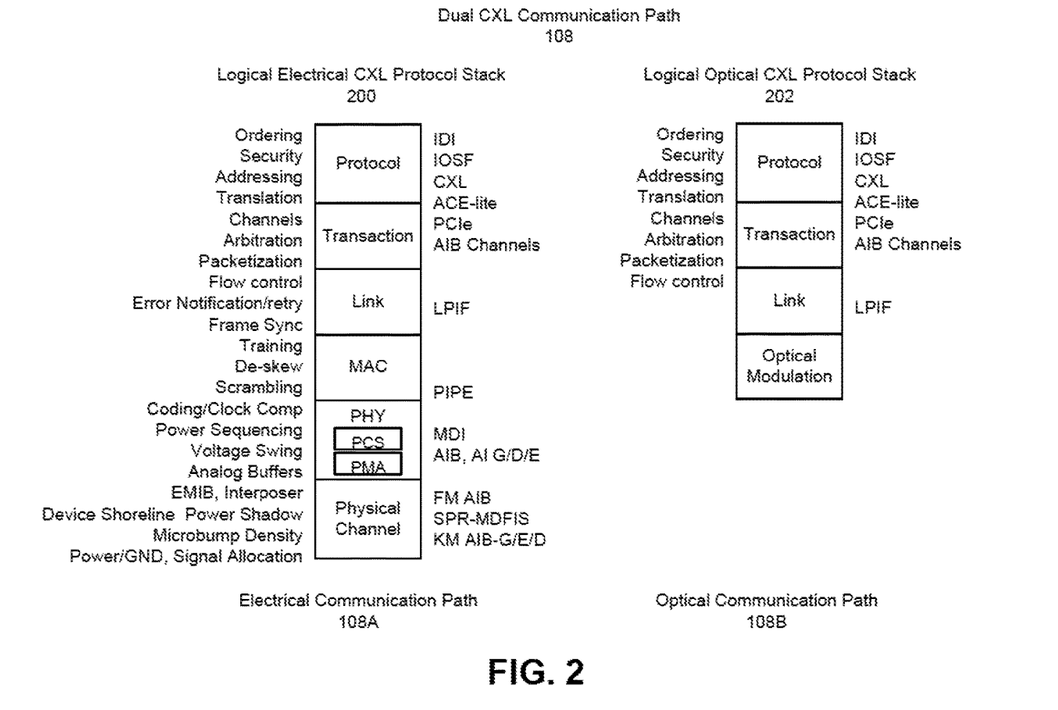
FIG. 2 is a diagram illustrating a logical electrical CXL protocol stack and a logical optical CXL protocol stack and protocol layers therein.

FIG. 2 is a diagram illustrating a logical electrical CXL protocol stack and a logical optical CXL protocol stack and protocol layers therein. The logical electrical CXL protocol stack 200 is incorporated into the electrical communication path 108A, and the logical optical CXL protocol stack 202 is incorporated into the optical communication path 108B. The logical electrical CXL protocol stack 200 includes a protocol layer, a transaction layer, a link layer, a MAC layer, a fire layer, and a physical channel. In the protocol layer and the transaction layer, In-die Interface (IDI) communication that connects each IP block (e.g., CPU cores+L2, graphics, system agent), is translated into CXL, and CX is translated into PCIe. The link layer forms LPIF data frames as an interface between the link layer and a logical physical layer defined by the MAC layer. The physical (PHY) layer defines the means of transmitting raw bits over a physical data link.

As shown, the logical optical CXL protocol stack 202 includes notably less layers than the logical electrical CXL protocol stack 200 because the CXL protocol layers after the link layer are not required to perform optical modulation. Consequently, the logical optical CXL protocol stack 202 provides a low-latency optical CXL path by transmitting and receiving optical signals directly after the link layer.

Figure 3:
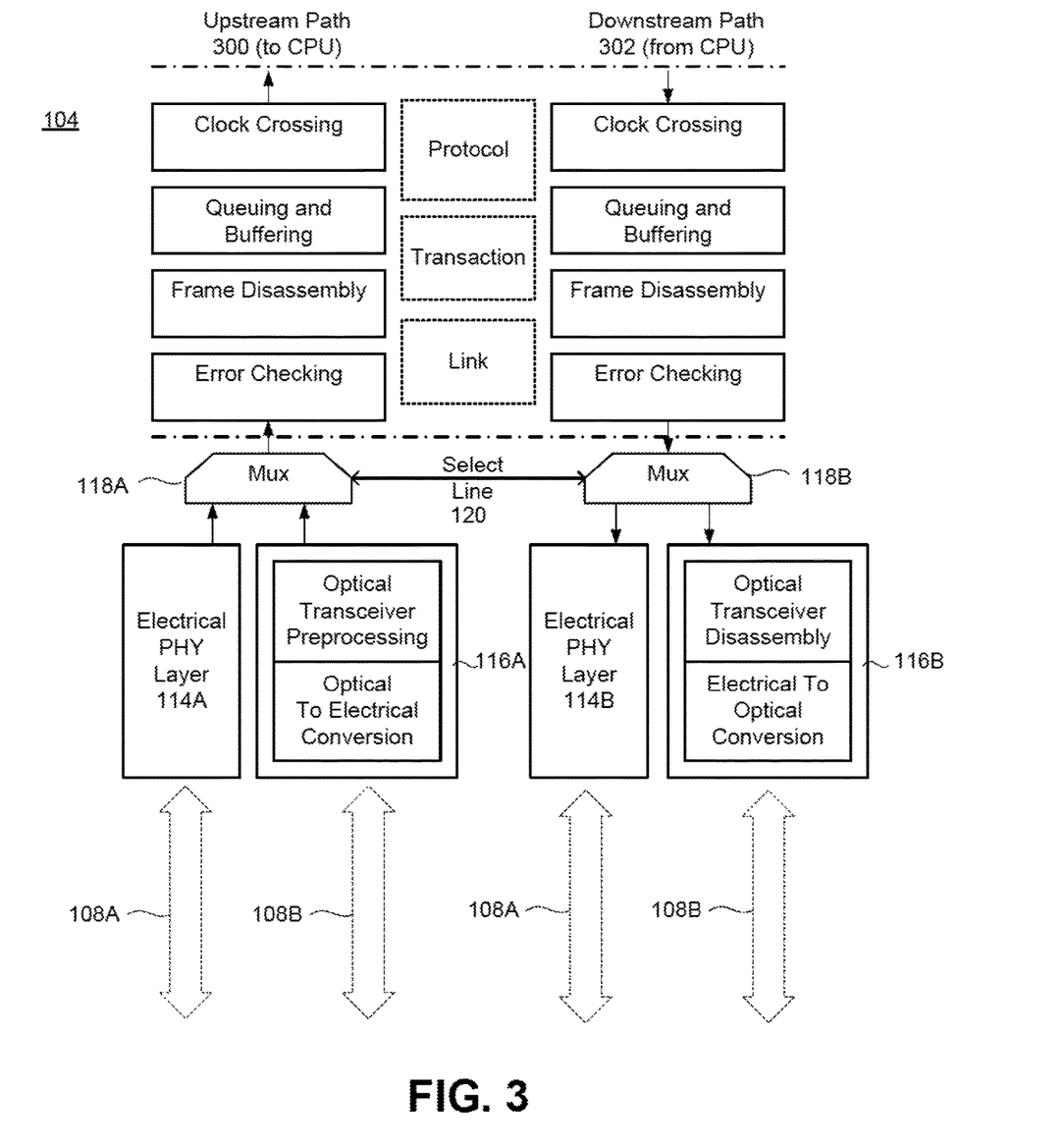
FIG. 3 is a logical diagram illustrating an upstream path and a downstream path between the CXL interface controller and the CPU.

FIG. 3 is a logical diagram illustrating an upstream path 300 and a downstream path 302 between the CXL interface controller 104 and the CPU 102. In the upstream path 300, data is received by CXL interface controller 104 and sent to the CPU 102. In the downstream path 302, data from the CPU 102 is transmitted by the CXL interface controller 104 either by the electrical PHY layer 114 or optically by the optical transceiver 116. In FIG. 1, components of the CXL interface controller 104 are shown as singular entities. That is, one multiplexer 118, one electrical PHY layer 114 and one optical transceiver 116 are shown. However, in FIG. 3 components of the CXL interface controller 104 are split in the logical diagram to show the functionality for the upstream path 300 separately from the functionality for the downstream path 302. Also shown are some of the processing steps performed by upper protocol, transaction, and link layers.

According to the disclosed embodiments, the electrical communication path 108A and the optical communication path 108B coexists, and based on selection by the multiplexer 118, one or the other is used to transmit/receive data. The optical communication path 108B does not require as much processing as the electrical communication path 108A, hence delivering lower latency for extremely high bandwidth.

In the upstream path 300, a data stream is received at the PHY interface layer. That is, the electrical PHY layer 114a receives the data stream of LPIF frames from the electrical communication path 108A. The optical transceiver 116A receives a data stream of LPIF frames from the optical communication path 108A, and performs optical to electrical conversion, and optical transceiver preprocessing. Before the data is sent to the CPU, the link layer unpacks the LPIF frames and processing steps such as error checking, frame disassembly, queuing and buffering and clock crossing are performed.

In the downstream path 300, data from the CPU is received and processing steps such as clock crossing, queuing and buffering, frame disassembly, and error checking are performed, and the link layer packs the data into LPIF frames.

If the multiplexer 118B has selected electrical communication path 108A via the select line 120, then the LPIF frames are directed to the electrical PHY layer 114B. If the multiplexer 118B has selected the optical communication path 108B, then the LPIF frames are directed to the optical transceiver 116B. The optical transceiver 116B performs optical transceiver disassembly, and electrical to optical conversion.

An exemplary processing scheme involving fabrication of a server CPU has a low-latency optical communication path for CXL will now be described. According to embodiments, a process flow for fabricating a processor system on a chip (SOC) may begin by fabricating one or more central processing units (CPUs) comprising multiple cores. A dual CXL communication path is fabricated to comprise i) an electrical communication path incorporating a logical electrical CXL protocol stack having multiple levels including a protocol layer, a transaction layer, a link layer, a MAC layer, a PHY layer, and a physical channel to transmit and receive an electrical bit stream; and ii) an optical CXL communication path incorporating a logical optical CXL protocol stack path that transmits and receives an optical bit stream directly after the link layer, bypassing multiple levels of the CXL protocol stack. A multiplexer is then connected to the CXL data path to direct data frames to either select the electrical communication path or the optical communication path.

Figure 4:
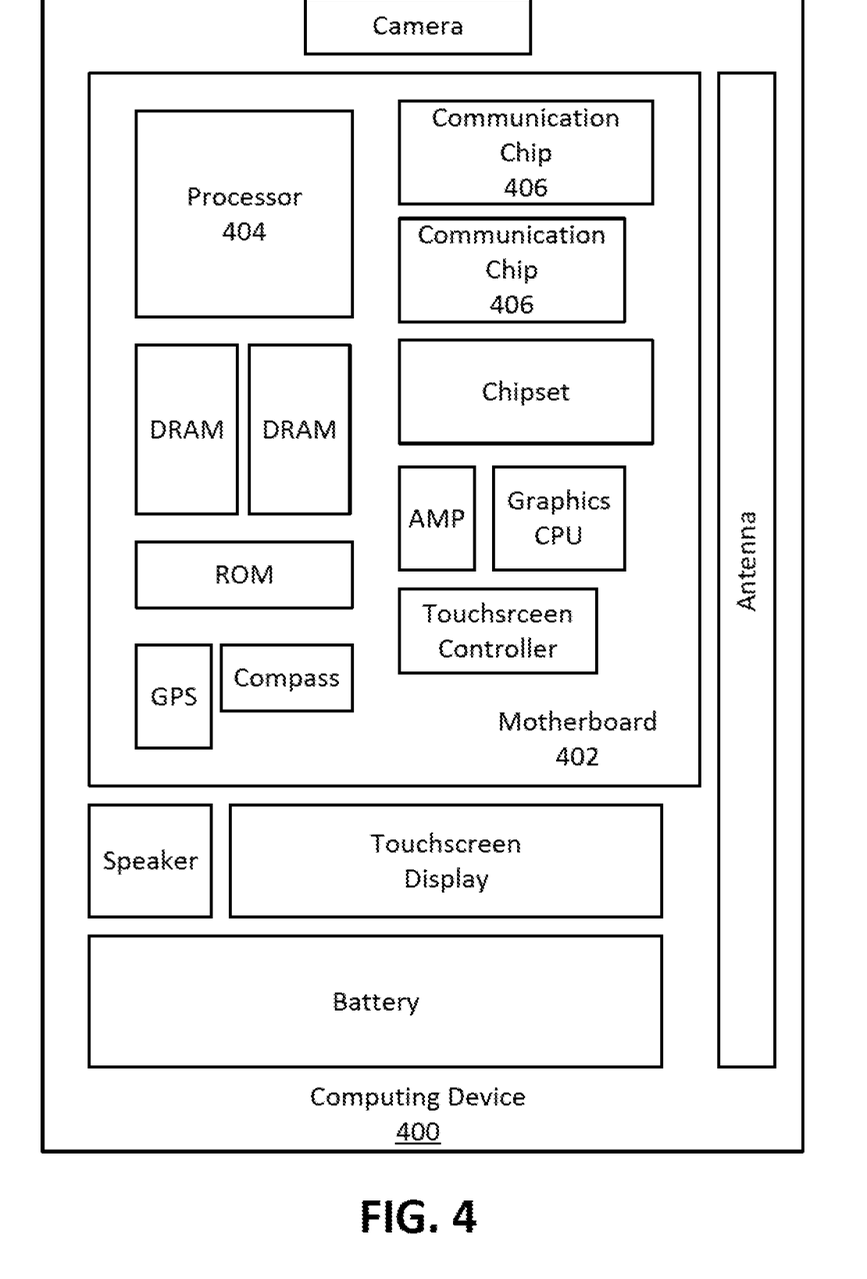
FIG. 4 illustrates a computing device in accordance with one implementation of the disclosure.

FIG. 4 illustrates a computing device 400 in accordance with one implementation of the disclosure. The computing device 400 houses a board 402. The board 402 may include a number of components, including but not limited to a processor 404 and at least one communication chip 406. The processor 404 is physically and electrically coupled to the board 402. In some implementations the at least one communication chip 406 is also physically and electrically coupled to the board 402. In further implementations, the communication chip 406 is part of the processor 404.

Depending on its applications, computing device 400 may include other components that may or may not be physically and electrically coupled to the board 402. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 406 enables wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth and a second communication chip 406 may be dedicated to longer range wireless communications such as GPS, EDGE, GPRS, CDMA, WiMAX, LTE, Ev-DO, and others. The communication chip 406 includes an integrated circuit die packaged within the communication chip 406

The processor 404 of the computing device 400 includes an integrated circuit die packaged within the processor 404.

In some implementations of the disclosure, the processor 404 may comprise processor SOC having a low-latency optical connection for CXL in accordance with implementations of embodiments of the disclosure. The term "processor" may refer to any device or portion of a device that processes electronic data from registers and/or memory to transform that electronic data into other electronic data that may be stored in registers and/or memory.

In further implementations, another component housed within the computing device 400 may contain processor chip complex in accordance with implementations of embodiments of the disclosure.

In various implementations, the computing device 400 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 500 may be any other electronic device that processes data.

Thus, embodiments described herein include a processor architecture that supports an optical CXL communication path or a dual Compute Express Link (CXL) communication path comprising both the electrical CXL communication path and an optical CXL communication path.

The above description of illustrated implementations of embodiments of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

Example Embodiment 1

A processor having a system on a chip (SOC) architecture comprises one or more central processing units (CPUs) comprising multiple cores. An optical Compute Express Link (CXL) communication path incorporating a logical optical CXL protocol stack path transmits and receives an optical bit stream directly after the link layer, bypassing multiple levels of the CXL protocol stack. A CXL interface controller is connected to the one or more CPUs to enable communication between the CPUs and one or more CXL devices over the optical CXL communication path.

Example Embodiment 2

The processor of embodiment 1, wherein the CXL interface controller includes an optical interface to control the optical CXL communication path.

Example Embodiment 3

The processor of embodiment 1 or 2, wherein the optical interface comprises an optical transceiver to control communication between the CPU and the one or more CXL devices over the optical communication path.

Example Embodiment 4

The processor of embodiment 1, 2, or 3, further comprising an electrical communication path incorporating a logical electrical protocol stack having multiple levels including a protocol layer, a transaction layer, a link layer, a MAC layer, a PHY layer, and a physical channel to transmit and receive an electrical bit stream to provide a dual CXL communication path.

Example Embodiment 5

The processor of embodiment 4, wherein the CXL interface controller further includes an electrical interface to control the electrical communication path.

Example Embodiment 6

The processor of embodiment 5, wherein the electronic interface and electrical communication path comprise an Ethernet network interface based on Ethernet protocols.

Example Embodiment 7

The processor of embodiment 5 or 6, wherein the CXL interface controller multiplexes the dual CXL communication path between the electrical communication path and the optical communication path through the electrical interface and the optical.

Example Embodiment 8

The processor of embodiment 4, 5, 6, or 7, wherein the CXL interface controller further includes a multiplexer to direct data frames to either the electrical communication path or the optical communication path.

Example Embodiment 9

The processor of embodiment 8, wherein the multiplexer selects between the electrical interface and the optical interface using select lines.

Example Embodiment 10

The processor of embodiment 8 or 9, wherein the CXL interface controller controls selection by the multiplexer based on the physical distance between the at least one CXL device and the one or more CPUs.

Example Embodiment 11

A processor system on a chip (SOC) comprises one or more central processing units (CPUs) comprising multiple cores. A dual Compute Express Link (CXL) communication path comprises i) an electrical communication path incorporating a logical electrical CXL protocol stack having multiple levels including a protocol layer, a transaction layer, a link layer, a MAC layer, a PHY layer, and a physical channel to transmit and receive an electrical bit stream; and ii) an optical CXL communication path incorporating a logical optical CXL protocol stack path that transmits and receives an optical bit stream directly after the link layer, bypassing multiple levels of the CXL protocol stack. A multiplexer directs data frames to either the electrical communication path or the optical communication path. At least CXL device is connected to the dual CXL communication path.

Example Embodiment 12

The processor SOC of embodiment 11, wherein the CXL interface controller includes an electrical interface to control the electrical communication path and an optical interface to control the optical communication path.

Example Embodiment 13

The processor SOC of embodiment 11 or 12, wherein the CXL interface controller controls selection by the multiplexer based on the physical distance between the at least one CXL device and the one or more CPUs.

Example Embodiment 14

The processor SOC of embodiment 13, wherein if a distance a data stream must travel between the CPU and the at least one CXL device is large, then the CXL interface controller causes the multiplexer to enable the optical communication path.

Example Embodiment 15

The processor SOC of embodiment 13, wherein if a distance a data stream must travel between the CPU and the at least one CXL device is relatively short or requires low bandwidth, then the CXL interface controller causes the multiplexer to disable the optical communication path.

Example Embodiment 16

The processor SOC of embodiment 11, 12, 13, 14, or 15, wherein the at least one CXL device comprise a memory device, a storage device, an accelerator device, a system management controller or a system boot device.

Example Embodiment 17

The processor SOC of embodiment 11, 12, 13, 14, 15, or 16, wherein the at least CXL device comprises an on-chip component within the processor.

Example Embodiment 18

The processor SOC of embodiment 11, 12, 13, 14, 15, or 16, wherein the at least CXL device comprises an off-chip component.

Example Embodiment 19

The processor SOC of embodiment 11, 12, 13, 14, 15, 16 or 17, wherein the at least CXL device is located on a backside of a processor board of the processor SOC.

Example Embodiment 20

The processor SOC of embodiment 11, 12, 13, 14, 15, 16 or 17, wherein the at least CXL device is located on a separate I/O board located in a server rack.

Example Embodiment 21

A method of fabricating a processor system on a chip (SOC) comprises fabricating one or more central processing units (CPUs) comprising multiple cores. A dual Compute Express Link (CXL) communication path is fabricated comprising: i) an electrical communication path incorporating a logical electrical CXL protocol stack having multiple levels including a protocol layer, a transaction layer, a link layer, a MAC layer, a PHY layer, and a physical channel to transmit and receive an electrical bit stream; and ii) an optical CXL communication path incorporating a logical optical CXL protocol stack path that transmits and receives an optical bit stream directly after the link layer, bypassing multiple levels of the CXL protocol stack. A multiplexer is connected to the CXL data path to direct data frames to either select the electrical communication path or the optical communication path.

Example Embodiment 22

The embodiment of embodiment 21, further comprising a CXL interface controller with an electrical interface and an optical interface, each connected to the multiplexer.

Example Embodiment 23

The method of embodiment 22, further comprising configuring the electronic interface with an electrical physical layer to control communication between the one or more CPUs and one or more CXL devices over the electrical communication path.

Example Embodiment 24

The method of embodiment 21, 22 or 23, further comprising configuring the optical interface with an optical transceiver to control communication between the one or more CPUs and one or more CXL devices over the optical communication path.

What is claimed is:
1. A processor having a system on a chip (SOC) architecture, comprising:
    one or more central processing units (CPUs) comprising multiple cores;
    an optical Compute Express Link (CXL) communication path incorporating a logical optical CXL protocol stack path that transmits and receives an optical bit stream directly after a link layer, bypassing multiple levels of the optical CXL protocol stack; and
    a CXL interface controller connected to the one or more CPUs to enable communication between the one or more CPUs and one or more CXL devices over the optical CXL communication path.
2. The processor of claim 1, wherein the CXL interface controller includes an optical interface to control the optical CXL communication path.
3. The processor of claim 2, wherein the optical interface comprises an optical transceiver to control communication between the one or more CPUs and the one or more CXL devices over the optical CXL communication path.
4. The processor of claim 2, further comprising an electrical communication path incorporating a logical electrical protocol stack having the multiple levels including a protocol layer, a transaction layer, the link layer, a MAC layer, a PHY layer, and a physical channel to transmit and receive an electrical bit stream to provide a dual CXL communication path.
5. The processor of claim 4, wherein the CXL interface controller further includes an electrical interface to control the electrical communication path.

6. The processor of claim 5, wherein the electrical interface and the electrical communication path comprise an Ethernet network interface based on Ethernet protocols.

7. The processor of claim 5, wherein the CXL interface controller multiplexes the dual CXL communication path between the electrical communication path and the optical CXL communication path through the electrical interface and the optical interface.

8. The processor of claim 5, wherein the CXL interface controller further includes a multiplexer to direct data frames to either the electrical communication path or the optical CXL communication path.

9. The processor of claim 8, wherein the multiplexer selects between the electrical interface and the optical interface using select lines.

10. The processor of claim 8, wherein the CXL interface controller controls selection by the multiplexer based on a physical distance between the one or more CXL devices and the one or more CPUs.

11. A processor system on a chip (SOC), comprising:
one or more central processing units (CPUs) comprising multiple cores;
a dual Compute Express Link (CXL) communication path comprising:
an electrical communication path incorporating a logical electrical CXL protocol stack having multiple levels including a protocol layer, a transaction layer, a link layer, a MAC layer, a PHY layer, and a physical channel to transmit and receive an electrical bit stream; and
an optical CXL communication path incorporating a logical optical CXL protocol stack path that transmits and receives an optical bit stream directly after the link layer, bypassing several levels of the logical electrical CXL protocol stack;
a multiplexer to direct data frames to either the electrical communication path or the optical CXL communication path; and
at least one CXL device connected to the dual CXL communication path.

12. The processor SOC of claim 11, wherein a CXL interface controller includes an electrical interface to control the electrical communication path and an optical interface to control the optical CXL communication path.

13. The processor SOC of claim 12, wherein the CXL interface controller controls selection by the multiplexer based on a physical distance between the at least one CXL device and the one or more CPUs.

14. The processor SOC of claim 11, wherein the at least one CXL device comprises a memory device, a storage device, an accelerator device, a system management controller or a system boot device.

15. The processor SOC of claim 12, wherein the at least one CXL device comprises an on-chip component within the processor SOC.

16. The processor SOC of claim 12, wherein the at least one CXL device comprises an off-chip component.

17. The processor SOC of claim 12, wherein the at least one CXL device is located on a backside of a processor board of the processor SOC.

18. The processor SOC of claim 12, wherein the at least one CXL device is located on a separate I/O board located in a server rack.

19. A method of fabricating a processor system on a chip (SOC), the method comprising:
fabricating one or more central processing units (CPUs) comprising multiple cores;
fabricating a dual Compute Express Link (CXL) communication path comprising:
an electrical communication path incorporating a logical electrical CXL protocol stack having multiple levels including a protocol layer, a transaction layer, a link layer, a MAC layer, a PHY layer, and a physical channel to transmit and receive an electrical bit stream; and
an optical CXL communication path incorporating a logical optical CXL protocol stack path that transmits and receives an optical bit stream directly after the link layer, bypassing several levels of the logical electrical CXL protocol stack;
connecting a multiplexer to the optical CXL communication path to direct data frames to either select the electrical communication path or the optical CXL communication path.

20. The method of claim 19, further comprising a CXL interface controller with an electrical interface and an optical interface, each connected to the multiplexer.

21. The method of claim 20, further comprising configuring the electrical interface with an electrical physical layer to control communication between the one or more CPUs and one or more CXL devices over the electrical communication path.

22. The method of claim 20, further comprising configuring the optical interface with an optical transceiver to control communication between the one or more CPUs and one or more CXL devices over the optical CXL communication path.

* * * * *